United States Patent
Leah et al.

(10) Patent No.: US 10,008,726 B2
(45) Date of Patent: Jun. 26, 2018

(54) METAL SUPPORTED SOLID OXIDE FUEL CELL

(71) Applicant: Ceres Intellectual Property Company Limited, Horsham (GB)

(72) Inventors: Robert Leah, Horsham (GB); Mike Lankin, Horsham (GB); Robin Pierce, Horsham (GB); Adam Bone, Horsham (GB)

(73) Assignee: Ceres Intellectual Property Company Limited, West Sussex (GB)

( * ) Notice: Subject to any disclaimer, the term of this patent is extended or adjusted under 35 U.S.C. 154(b) by 0 days. days.

(21) Appl. No.: 14/992,531

(22) Filed: Jan. 11, 2016

(65) Prior Publication Data

US 2016/0254549 A1    Sep. 1, 2016

Related U.S. Application Data

(62) Division of application No. 14/053,301, filed on Oct. 14, 2013, now Pat. No. 9,236,614.

(30) Foreign Application Priority Data

Sep. 4, 2013 (GB) .................................. 1315746.6

(51) Int. Cl.
  *H01M 4/86*  (2006.01)
  *H01M 4/90*  (2006.01)
  (Continued)

(52) U.S. Cl.
  CPC ........... *H01M 4/8652* (2013.01); *C23C 18/02* (2013.01); *H01M 4/8621* (2013.01);
  (Continued)

(58) Field of Classification Search
  CPC ............. H01M 4/8652; H01M 4/8621; H01M 4/8657; H01M 4/8803; H01M 4/8828;
  (Continued)

(56) References Cited

U.S. PATENT DOCUMENTS 5,908,713 A    6/1999  Ruka
6,709,628 B2   3/2004  Kleinlogel
(Continued)

FOREIGN PATENT DOCUMENTS

CN    1409427    4/2003
EP    1702376    2/2004
(Continued)

OTHER PUBLICATIONS

Notice of Allowability for U.S. Appl. No. 14/053,301 dated Sep. 25, 2015.
(Continued)

*Primary Examiner* — Oi K Conley
(74) *Attorney, Agent, or Firm* — Snell & Wilmer L.L.P.

(57) ABSTRACT

A process for forming a metal supported solid oxide fuel cell, the process comprising the steps of: a) applying a green anode layer including nickel oxide, copper oxide and a rare earth-doped ceria to a metal substrate; b) firing the green anode layer to form a composite including oxides of nickel, copper, and a rare earth-doped ceria; c) providing an electrolyte; and d) providing a cathode. Metal supported solid oxide fuel cells comprising an anode a cathode and an electrolyte, wherein the anode includes nickel, copper and a rare earth-doped ceria, fuel cell stacks and uses of these fuel cells.

5 Claims, 6 Drawing Sheets

(51) Int. Cl.
  *C23C 18/02* (2006.01)
  *H01M 8/1213* (2016.01)
  *H01M 8/2425* (2016.01)
  *H01M 4/88* (2006.01)
  *H01M 8/1226* (2016.01)
  *H01M 8/124* (2016.01)

(52) U.S. Cl.
  CPC ....... *H01M 4/8657* (2013.01); *H01M 4/8803* (2013.01); *H01M 4/8828* (2013.01); *H01M 4/8882* (2013.01); *H01M 4/8885* (2013.01); *H01M 4/8896* (2013.01); *H01M 4/9025* (2013.01); *H01M 4/9033* (2013.01); *H01M 8/1213* (2013.01); *H01M 8/1226* (2013.01); *H01M 8/2425* (2013.01); *H01M 4/8889* (2013.01); *H01M 2004/8684* (2013.01); *H01M 2008/1293* (2013.01)

(58) Field of Classification Search
  CPC ............ H01M 4/8882; H01M 4/8885; H01M 4/8896; H01M 4/9025; H01M 4/9033; H01M 4/1213; H01M 4/1226; H01M 4/2425
  See application file for complete search history.

(56) References Cited

U.S. PATENT DOCUMENTS

| | | | |
|---|---|---|---|
| 7,014,942 B2 | 3/2006 | Gorte | |
| 7,855,003 B2 * | 12/2010 | Arico | B01J 23/755 429/465 |
| 8,039,175 B2 | 10/2011 | Linderoth | |
| 2004/0195091 A1 | 10/2004 | D'Astolfo | |
| 2005/0227133 A1 | 10/2005 | Gorte | |
| 2008/0070084 A1 | 3/2008 | Ishihara | |
| 2008/0096079 A1 | 4/2008 | Linderoth | |
| 2008/0107948 A1 * | 5/2008 | Yamanis | H01M 8/021 429/457 |
| 2008/0254336 A1 | 10/2008 | Batawi | |
| 2010/0098996 A1 | 4/2010 | Hwang | |
| 2011/0091794 A1 | 4/2011 | Lee | |
| 2012/0009507 A1 | 1/2012 | Wood | |
| 2012/0021332 A1 | 1/2012 | Hwang | |
| 2012/0121999 A1 | 5/2012 | Laurencin | |
| 2012/0186976 A1 | 7/2012 | Laucournet | |
| 2013/0108943 A1 | 5/2013 | Yamanis | |

FOREIGN PATENT DOCUMENTS

| | | | |
|---|---|---|---|
| GB | 2368450 | 5/2002 | |
| GB | 2386126 | 9/2003 | |
| GB | 2386126 A1 * | 10/2003 | |
| GB | 2400486 | 10/2004 | |
| GB | 2456445 | 7/2009 | |
| KR | 20130079153 | 7/2013 | |
| WO | 200039864 | 7/2000 | |
| WO | WO 2005064717 A1 * | 7/2005 | ............ H01M 4/86 |
| WO | 2007044045 | 4/2007 | |
| WO | 2007104329 | 9/2007 | |
| WO | 2008121128 | 10/2008 | |
| WO | 2010066444 | 6/2010 | |
| WO | 2011096939 | 8/2011 | |

OTHER PUBLICATIONS

The International Preliminary Report on Patentability for International Application No. PCT/GB2014/052549 dated Mar. 17, 2016.
The Written Opinion of the International Searching Authority for International Application No. PCT/GB2014/052549 dated Mar. 4, 2016.
The International Search Report for International Application No. PCT/GB2014/052549 dated Nov. 11, 2014.
The Written Opinion of the International Searching Authority for International Application No. PCT/GB2014/052546 dated Dec. 1, 2014.
The International Preliminary Report on Patentability for International Application No. PCT/GB2014/052546 dated Mar. 8, 2016.
Search Report for GB1315746.6, UK Intellectual Property Office, dated Feb. 25, 2014.
Search Report for GB1315744.1, UK Intellectual Property Office, dated Feb. 25, 2014.
Notice of Allowability, Corrected, for U.S. Appl. No. 14/053,216 dated Nov. 3, 2017.
Notice of Allowability for U.S. Appl. No. 14/053,216 dated Oct. 5, 2017.
Non-Final Office Action for U.S. Appl. No. 14/053,216 dated May 27, 2015.
Non-Final Office Action for U.S. Appl. No. 14/053,216 dated Feb. 17, 2016.
Final Office Action for U.S. Appl. No. 14/053,216 dated Nov. 15, 2016.
Non-Final Office Action for U.S. Appl. No. 14/053,216 dated Mar. 31, 2017.
The International Search Report for International Application No. PCT/GB2014/052546 dated Jan. 12, 2014.
*tee of Allowance for U.S. Application No. 14/053,216 dated Feb. 28, 2018.

* cited by examiner

| Test type | Anode type | Mean pull-off pressure/ MPa | Number of cells tested* |
|---|---|---|---|
| As manufactured | NiO/CGO10 | 14.0 | 19 |
| As manufactured | NiO/CuO/CGO10 | >17 | 5 |
| After test | Ni/CGO10 | 6.7 | 21 |
| After test | Ni/Cu/CGO10 | >17 | 5 |

* 5 measurements per cell

METAL SUPPORTED SOLID OXIDE FUEL CELL

PRIORITY

The present application claims priority to, and is a divisional application of, U.S. patent application Ser. No. 14/053,301 titled "Metal Supported Solid Oxide Fuel Cell" of Leah, et al. filed on Oct. 14, 2013, the disclosure of which is incorporated by reference herein, and claims priority under 35 U.S.C. § 119 to GB Application No. 1315746.6, filed Sep. 4, 2013.

FIELD

The invention relates to a metal supported solid oxide fuel cell (SOFC), to processes for forming the fuel cell and to uses thereof. The invention relates, in particular, to metal supported solid oxide fuel cells wherein the anode comprises nickel and copper.

BACKGROUND

A SOFC is an electrochemical device for the generation of electrical energy through the electrochemical oxidation of a fuel gas (usually hydrogen-based). The device is generally ceramic-based, using an oxygen-ion conducting metal-oxide derived ceramic as its electrolyte. As most ceramic oxygen ion conductors (for instance, doped zirconium oxide or doped cerium oxide) only demonstrate technologically relevant ion conductivities at temperatures in excess of 500° C. (for cerium-oxide based electrolytes) or 600° C. (for zirconium oxide based ceramics), SOFCs operate at elevated temperatures.

In common with other fuel cells, SOFCs include an anode where fuel is oxidised, and a cathode where oxygen is reduced. These electrodes must be capable of catalysing the electrochemical reactions, be stable in their respective atmospheres at the temperature of operation (reducing on the anode side, oxidising on the cathode side), and be able to conduct electrons so the electric current generated by the electrochemical reactions can be drawn away from the electrode-electrolyte interface.

Finding materials with the relevant combination of properties for the anode has, in spite of extensive research, proved difficult. For many years, the state-of-the-art SOFC anode has consisted of a porous ceramic-metal (cermet) composite structure, with nickel as the metallic phase and an electrolyte material (usually yttria or Scandia-stabilised zirconia) as the ceramic phase, although less commonly doped ceria-based electrolyte materials such as gadolinia or samaria-doped ceria have also been used. In this structure, the nickel performs the role of catalyst, and the volume fraction of nickel is high enough that a contiguous metal network is formed, thus providing the required electronic conductivity. The electrolyte material forms a contiguous ceramic backbone to the anode, providing mechanical structure, enhancing the bond between the anode and the electrolyte and also extending the anode-electrolyte interfacial region some distance into the anode.

A well-known limitation of these cermet anodes is that at cell operating temperature the metallic nickel in the anode is only stable in a reducing atmosphere. This is normally provided by the fuel gases, so under normal operation the anode is stable. However, should the supply of fuel gas be interrupted with the SOFC at operating temperature, the atmosphere within the anode will become oxidising. Under these conditions the metallic nickel will oxidise back to nickel oxide. This oxidation is associated with a volume increase of greater than approximately 40%, because the metallic nickel which has been formed by the reduction of sintered nickel oxide does not oxidise back to the same morphology as the original nickel oxide from which it was formed. Instead it generates mesoporosity, occupying a larger volume than the original nickel oxide. This volume change on reoxidation can generate large stresses in the anode structure, which in turn can result in cracking of the anode and potential destruction of the SOFC cell.

The inability of many SOFC cells to undergo multiple reduction-oxidation (REDOX) cycles without suffering damage of this type has been a major factor inhibiting the widespread commercial adoption of SOFC technology for power generation, as SOFC systems generally require the presence of complex and expensive purge gas systems to maintain a reducing atmosphere over the anodes in the event of an unexpected fuel interruption, for example due to a failure elsewhere in the system which requires an emergency shutdown of the system for safety reasons.

The problem of inadequate REDOX stability is particularly acute in anode supported fuel cells, currently the most common form of SOFC cell. Anode support is beneficial as it allows a very thin (<20 µm) layer of electrolyte (such as stabilised zirconia) to be used, as the electrolyte is non-structural. This in turn allows operation at a lower temperature range than is the case for electrolyte supported cells (650 to 800° C. rather than 850 to 1000° C.). Because the resistance of the electrolyte to oxygen ion transport is inversely proportional to the electrolyte thickness, in electrolyte supported fuel cells, the resistance caused by the thickness of the electrolyte layer is overcome by increasing operation temperatures, exploiting the exponential drop off in resistance with temperature. As thinner layers can be used in anode supported cells, operation temperatures can be reduced, which is generally desirable as it facilitates the use of lower-cost materials in the SOFC system, and reduces the rate of various material degradation mechanisms such as the oxidation of metallic components.

In spite of these advantages, as the anode is the structural support of the SOFC cell in an anode-supported cell, the cells are very prone to catastrophic failure on repeated REDOX cycling, as stress-induced cracking can result in the cell completely breaking up.

In spite of considerable efforts by developers, no alternative to nickel has achieved widespread adoption, as no suitable material has yet been developed which combines nickel's relatively low cost, high catalytic activity for both electrochemical oxidation of hydrogen and steam reforming of hydrocarbon fuel feeds, and high electronic conductivity.

Gorte et. al. (US 2005/227133 A1, U.S. Pat. No. 7,014,942 B2) have reported the use of copper in a SOFC anode partially or completely substituted for nickel. Copper has advantages as an electronically conductive phase in the anode, notably that it does not catalyse the formation of carbon from hydrocarbon fuels. However it is a poor catalyst for the electrochemical oxidation of hydrogen and steam reforming of hydrocarbon fuels, so in the copper anodes tested by Gorte et al., an additional catalyst such as ceria was required to achieve adequate electrode performance. The other issue with the use of copper in conventional SOFC applications is that both copper metal and copper oxide have low melting points (1084° C. and 1326° C. respectively). Cermet anodes are typically formed by sintering a mixture of the metal oxide powder and the electrolyte powder at 1200-1500° C. in air, followed by reduction of the metal oxide to the metal using hydrogen on first operation of the SOFC. This range of sintering temperatures is either close to or above the melting point of copper oxide (nickel oxide by contrast melts at 1955° C.), leading to excessive sintering of the copper oxide phase. Also conventional SOFC operating temperatures are in the range 700-900° C., close to the melting point of metallic copper, which tends to result in sintering of the copper phase during SOFC operation, potentially causing performance degradation. To address this issue, Gorte et al. developed a method of adding the copper to the anode in a post-sintering infiltration step using solutions of copper salts which were dried and then calcined to decompose the salt to copper oxide, thereby avoiding the need to sinter copper oxide at high temperatures. However, the infiltration step, whilst allowing the use of copper cermets, may be difficult to scale up to industrial production. Another issue with copper is that although less reactive than nickel, it will still oxidise if exposed to an oxidising atmosphere at temperature, and thus a copper-based anode also lacks REDOX stability.

There are factors relating to the design of the SOFC which can help mitigate the damaging effects of REDOX cycling, these include:

Not using an anode supported cell—the anode can therefore be thinner; reducing the overall volume change through REDOX cycling and the danger of catastrophic cracking.

Operating at a lower temperature—the rate of nickel oxidation increases exponentially with increasing temperature, starting at >300° C. The lower the temperature of operation, the less risk of nickel oxidation and volume expansion. Further, nickel particles tend to oxidise though a core-and-shell mechanism, where the outer surface oxidises rapidly, but then the core of the particle oxidises more slowly as this is diffusion limited. Thus at lower temperatures, it is likely that only the outer surface of the nickel particles in the anode will reoxidise, not the entire particle and any volume change will be reduced.

Provide the anode with a contiguous ceramic 'backbone'—As the electrolyte-based ceramic phase used in SOFC anodes is largely unaffected by changes in oxygen partial pressure, this part of the anode will not change volume during REDOX cycles affecting the nickel phase. Thus the structural integrity of the anode and its bond to the electrolyte will be enhanced if there is a sintered porous ceramic network within the anode.

A design of SOFC cell which has the potential to meet these criteria is the metal-supported SOFC design disclosed by the applicant in GB 2 368 450. This SOFC cell uses a ferritic stainless steel foil as a structural support. The foil being made porous in its central region to allow fuel access to the anode. The active cell layers (anode, electrolyte and cathode) are all deposited on top of the substrate foil as films. This means the anode only needs to be around 15 µm thick as it is not the structural support for the cell. This cell also allows operation at temperatures in the range 450-650° C., much lower than standard operating temperatures. This is achieved through the use of predominantly cerium oxide (ceria)-based ceramic materials such as CGO10 (gadolinium doped-cerium oxide, for CGO 10—$Ce_{0.9}Gd_{0.1}O_{1.95}$) as the oxygen ion conducting electrolyte, which have an intrinsically higher oxygen ion conductivity than zirconia-based materials. A thin film of stabilised zirconia is deposited in the electrolyte to prevent internal short-circuiting of the cell due to the mixed ionic-electronic conductivity of ceria-based electrolytes, as disclosed in GB 2 456 445, but as the zirconia layer is so thin, its resistance to oxygen ion transport is sufficiently low that low-temperature operation is not prevented. The SOFC cell of GB 2 368 450 uses a porous metal-CGO10 composite cermet anode fabricated as a thick film with a thickness between 5 and 30 µm. The anode is generally deposited by screen-printing an ink containing metal oxide and CGO10 powders and formed into a porous ceramic layer by thermal processing to sinter the deposited powders together to form a contiguous structure bonded to the steel substrate.

A limitation imposed by the deposition of the ceramic layers onto a ferritic stainless steel support by conventional ceramic processing methods is the maximum temperature to which the steel may be exposed in an oxidising atmosphere due to the formation of a chromium oxide scale at high temperatures in an oxidising atmosphere. This upper limit is substantially below the 1200-1500° C. typically used when sintering ceramics and so methods have been developed for sintering rare earth doped ceria electrolytes to >96% of theoretical density at <1100° C., facilitating the formation of the gas-tight layer desired (GB 2 368 450, GB 2 386 126 and GB 2 400 486).

Surprisingly, sintering a nickel oxide-rare earth doped ceria composite anode at these temperatures has proved more difficult than sintering the electrolyte. This is because composites of two different oxide materials have been found to sinter more poorly than a single phase material. Thus nickel oxide or the ceramic alone will sinter adequately at these temperatures, but as a composite sintering in air can be poor, leading to weak necks between particles and a weak ceramic structure. This can result in cell failure as a result of REDOX cycling, as the weak bonds between nickel particles break as a result of the volume changes during the REDOX cycle. This can ultimately result in the catastrophic failure of the cell through delamination of the electrolyte from the anode.

In order to improve the REDOX stability of the cell, it is desirable to find a means of enabling sufficient sintering of the cermet structure at the temperature range at which it is possible to fire the ceramic layers on a steel substrate. It would therefore be advantageous to provide for a method of preparing a metal-supported SOFC in which the anode is stable to redox cycling, robust to a loss of reducing atmosphere at operating temperature, and yet can be made using commercially viable production methods. The invention is intended to overcome or ameliorate at least some aspects of this problem and those described above.

SUMMARY

Accordingly, in a first aspect of the invention there is provided a process for forming a metal supported SOFC, the process comprising the steps of:

a) applying a green anode layer including nickel oxide, copper oxide and a rare earth-doped ceria to a metal substrate;

b) firing the green anode layer to form a composite including oxides of nickel, copper, and a rare earth-doped ceria;

c) providing an electrolyte; and d) providing a cathode.

The presence of the copper in the anode layer, generally as copper oxide, provides an anode with improved sintering between the nickel oxide and the rare earth-doped ceria. This in turn enhances the formation of the ceramic backbone in the anode and increases the stability of the anode (and fuel cell as a whole) to REDOX cycling as the anode microstructure is more robust than if copper were absent and less prone to volume change during the reduction of nickel and copper oxide to nickel and copper on first use of the fuel cell, or during any change on reoxidation if the reducing atmosphere is lost at operating temperatures, for instance in the event of unplanned system failure and loss of fuel supply.

In many cases, the process of the invention will further comprise the step of compressing the green anode layer at pressures in the range 100 to 300 MPa. This compression step increases the density of the of the unsintered green anode layer, ensuring that the particles of nickel oxide, copper oxide and rare earth-doped ceria are in sufficiently close contact to sinter effectively at the temperatures employed in the process of the invention. It will often be the case that the compression step is used in combination with a step of heating the printed layer to remove residual organic materials from the ink base prior to compression, to leave a green anode layer comprising nickel oxide, copper oxide and a rare earth-doped ceria that may be compressed.

The first step of the process as described is the application of a green anode layer to the metal substrate, typically the metal substrate will be a stainless steel substrate, in particular a ferritic stainless steel substrate, as ferritic stainless steel forms a chromium oxide surface passivation layer when heated. This passivation layer protects the bulk metal of the support and provides a diffusion barrier between the anode and the bulk metal of the support. As used herein, the terms "support" and "substrate" as referring to the metal support/substrate are intended to be used interchangeably. The formation of a chromium oxide passivation layer, as opposed to aluminium oxide or silicon oxides commonly formed with other heat resistant steels, has the benefit that chromium oxide is an electronic semi-conductor at high temperatures, rather than being insulating, making the ferritic stainless steel suitable for use in fuel cell applications. The ferritic stainless steel may be an aluminium free ferritic stainless steel, such as a ferritic stainless steel containing titanium and/or niobium as stabilisers. Often the ferritic stainless steel will comprise from about 17.5 to 23 wt % Cr. In particular, the ferritic stainless steel may be selected from European designation 1.4509 (17.5 to 18.5 wt % Cr) and/or European designation 1.4760 (22 to 23 wt % Cr), although similar designations of ferritic stainless steel may also be used, as would be understood by the person skilled in the art.

The substrate may have a thickness in the range about 50 to 500 µm, often about 100 to 400 µm, in some cases about 200 to 350 µm. The thickness of the substrate is determined by the need to provide a stable substrate, which doesn't warp during cell formation or in use, yet which is as thin as possible to allow efficient contact between the fuel and the anode. As described in GB 2 368 450, this contact can be achieved with excellent results by the provision of a porous region bounded by a non-porous region of the substrate, over which the anode is formed. It will often be the case that the porous region of the substrate includes a plurality of through apertures fluidly interconnecting the one and other surface of the substrate, often these will be uniformly spaced, additionally or alternatively having a lateral dimension of from about 5 to 500 µm, or from about 100 to 300 µm. Further, the apertures may comprise from about 0.1 to 5 area % of the porous region of the substrate or from about 0.2 to 2 area % of the porous region of the substrate. Each of these features contribute to an efficient transfer of fuel through the substrate to the anode, whilst allowing the metal substrate to support the fuel cell, facilitating the use of dramatically reduced thicknesses of the electrochemically active layers within the cell.

Typically the substrate will be a foil, although a sintered substrate could also be used. The advantage of foils is the ease of control of the structure of the porous region.

The green anode layer is generally formed by application of an ink comprising the nickel oxide, copper oxide and rare earth-doped ceria, although other methods may be used. These three components will generally be suspended as powders within an ink base, the ink base generally comprising one or more volatile solvents, one or more dissolved non-volatile polymer binders, dispersants, wetting agents and other common ink components. The nickel oxide, copper oxide and rare earth-doped ceria will often be of particle size distribution d90 in the range 0.1 to 4 µm, or 0.2 to 2 µm or 0.7 to 1.2 µm. Whilst the particle size distributions, and sizes themselves, of each of the copper oxide, nickel oxide and rare earth-doped ceria may be different, it can be beneficial if they are the same, or similar, as this helps to facilitate good mixing of the powders and hence strong sintering of the anode. Small particle sizes are generally selected as these are more easily suspended in the ink, and offer a greater homogeneity of components within the anode layer, and have a higher surface area to volume ratio, increasing the reactivity of the particles and ease of sintering.

Typically, the ink will contain in the range 30 to 70 wt % of the solids content in the ink of mixed metal oxides (namely, the combination of copper oxide and nickel oxide). Often, this will be 35 to 45 wt %, the remainder of the solids being the rare earth-doped ceria. That is to say, it will often be the case that the only solids in the ink will be the metal oxides and the rare earth-doped ceria, and as such it will often also be the case that the anode consists of, or consists essentially of, nickel oxide, copper oxide and the rare earth-doped ceria. Often, the metal oxide component of the ink will comprise in the range 5 to 50 wt % of the total metal oxide of copper oxide, often 8 to 25 wt %. In many cases the copper oxide will be around 10 wt %, perhaps 8 or 9 to 11 or 12 wt % of the total metal oxide, the ratio of nickel oxide to copper oxide therefore being around 9:1. The ratio will typically be in the range 20:1 to 4:1, often in the range 15:1 to 6:1. It has been found that by selecting these levels of copper oxide doping, the relatively low melting point of the copper oxide offers enhanced sintering within the composite anode material, without lowering the metal oxide melting point below that necessary for sintering of the rare earth-doped ceria to occur, and without impairing anode functioning, in particular where the fuel is hydrogen, or where the fuel cell is steam reforming hydrocarbons.

It will often be the case that the copper oxide is copper (II) oxide, as this has a higher melting point than copper (I) oxide, and has semi-conductor properties. However, copper (I) oxide may also be used as this may form copper (II) oxide at high temperature in air.

In many examples, the rare earth-doped ceria will have the formula $Ce_{1-x}RE_xO_{2-x/2}$, where RE is a rare earth and $0.3 \geq x \geq 0.05$. Often, the rare earth-doped ceria will be gadolinium doped cerium oxide, often of the formula $Ce_{0.9}Gd_{0.1}O_{1.95}$ (CGO10). These compounds are generally used as they have a higher oxygen ion conductivity than many electrolyte materials, including zirconia-based materials; thereby allowing operation of the fuel cell at lower temperatures than conventional SOFCs, the temperature of operation of the fuel cell of the invention typically being in the range 450° C. to 650° C., often 500° C. to 620° C. Operating the fuel cell at lower temperatures has a number of benefits, including reduced rate of oxidation of nickel in non-reducing atmospheres, which in turn often results in only the outer shell of the particle oxidising, reducing volume change within the anode and hence risk of cracking in the event that the reducing atmosphere of the fuel supply is interrupted. Further, it makes the use of metal supports possible, allowing thinner layers of electrode and electrolyte material to be used, as these play less of a structural role, if any at all. In addition, these temperatures are well below the melting point of copper, providing the option of using copper as a component of the cell.

The application of the green anode layer generally includes an initial application of the ink to the metal substrate, this will typically be by printing, for instance by screen printing, although other methods, such as tape casting, vacuum slip casting, electrophoretic deposition and calendering may be used as would be known to the person skilled in the art. Where a porous region is present, the application of the ink to the substrate will typically be such that a layer is formed over the porous region, but the non-porous region is left substantially uncovered. This ensures that the fuel cannot bypass the anode, but minimises material costs and weight by covering no more of the substrate than necessary.

This initial application will optionally be followed by a step of drying the ink to provide a printed layer. The drying may be air drying, or under gentle heat. Gentle heat is often used to speed up the formation of the printed layer. Temperatures in the range 50° C. to 150° C. would be typical. The drying step evaporates solvents and sets any binders in any ink formulation used, solidifying the ink and forming an initial, albeit fragile, anode layer, termed here the printed layer. This layer will generally be of thickness in the range 5 to 40 µm, often 7 to 20 µm, often 9 to 15 µm. As the fuel cells of the invention are not anode supported cells, the anode layer can be much thinner than in many conventional fuel cells, which has the advantage that the overall volume change during REDOX cycling is smaller, and so cracking of the anode over time is significantly reduced.

The applied nickel oxide, copper oxide and rare earth-doped ceria; or the printed layer where a drying step is present, may then be heated to remove any organic components in an ink mixture, for instance, polymer binders typically present in inks. The temperature of this step will depend upon the binders present but will often be in the range 300 to 500° C. This heating step may be combined with the drying step, although to provide a well formed, even, green anode layer the solvents are generally first removed, and then the organic components of the mixture in a separate step.

Often, where required, the compression step described above will typically be applied after the ink has dried and the organics removed as at this stage the green anode layer comprises only the active components (namely the nickel oxide, copper oxide and rare earth-doped ceria). This allows the compression step to most efficiently compact the anode and increase the density of the oxides and ceria so that sintering is improved. A variety of compression methods may be used, as would be known to the person skilled in the art, although often uniaxial or cold isostatic pressing will be used.

The step of firing the green anode layer to form a composite including oxides of nickel, copper, and a rare earth-doped ceria provides for sintering of the rare earth-doped ceria and the metal oxides to form the ceramic structure of the anode. Firing of the green anode layer therefore generally occurs in a furnace at a temperature in the range 950 to 1100° C., often 980 to 1050° C. or 1000 to 1030° C. The upper limit of these ranges is selected on the basis of substrate stability. Above around 1100° C. even high chromium content steels, known for their high oxidation resistance, oxidise in air too rapidly for the substrate to survive the firing process. Specifically, the chromium oxide passivation layer grows and flakes repeatedly during the formation of the anode cermet, weakening the metal substrate to an unacceptable extent. The use of the rare earth-doped ceria facilitates the use of a metal substrate, together with the formation of a robust cermet as ceria compounds may be sintered at temperatures below 1100° C. The lower limit is guided by the need for successful sintering of the materials.

The firing step will typically be firing in air, although other non-reducing atmospheres may be used. Typically the firing step will be over a period 15 to 60 minutes. Whilst the firing period must be sufficient to allow sintering of the metal oxides and the rare earth-doped ceria, and to allow the furnace to reach thermal equilibrium; too long a firing period can increase oxidation of the metal support and lead to contamination of the anode with, where ferritic stainless steel is used, chromium evaporating from the support. Hence, the optimal firing period is in the range 15 to 60 minutes. After sintering the anode is allowed to cool, providing a robust, porous, anode structure containing nickel, copper and the rare earth-doped ceria as an ceramic oxygen ion conductor.

Whilst as described above the firing of the anode occurs before the electrolyte is provided, it may be that the electrolyte be applied over the green anode layer before firing occurs. As such, the process may comprise the step of providing an electrolyte before the step of firing the green anode layer, so that the electrolyte and green anode layer are simultaneously fired.

Typically, the electrolyte for use with the fuel cells of the invention will be of thickness in the range 5 to 30 µm, often in the range 10 to 20 µm. The provision of such a thin electrolyte layer provides for rapid transfer of oxygen ions from the cathode, to the anode. Often the electrolyte will comprise a rare earth-doped ceria, appropriate rare earth cerias being as defined above for the anode. In some examples, the electrolyte may comprise a rare earth-doped ceria combined with a low level of cobalt oxide and/or copper oxide, as a sintering aid, for instance there may be in the range 0.5 to 5 wt % cobalt oxide and/or copper oxide, the remaining electrolyte being the rare earth-doped ceria. The use of rare earth-doped cerias for both the anode and electrolyte helps to enhance the compatibility between these components of the fuel cell both chemically and in terms of the thermal expansion, which is closely matched reducing the mechanical stress between layers during REDOX cycling, and hence also reducing the likelihood of cracking and fuel cell failure in use. Further, as these cerias have high charge transfer rates, their inclusion ensures a good rate of charge transfer between the electrolyte and the anode.

The electrolyte will generally be sintered, either simultaneously with the anode as described above, or in a separate firing step after the anode is fully formed.

Typically the cathode will be of thickness in the range 30 to 60 µm, often 40 to 50 µm. The cathode will generally comprise two layers, a thin active layer where the reduction of oxygen takes place, and a thicker current collector layer, to allow the current to be collected from a cell in the stack. The current collector layer will generally be a perovskite such as lanthanum strontium cobaltite, although any electronically conductive ceramic material may be used.

The active layer cathode may comprise a sintered powdered mixture of perovskite oxide mixed conductor and rare earth-doped ceria, the rare earth-doped ceria being as defined above. The perovskite may comprise $La_{1-x}Sr_x$-$Co_yFe_{1-y}O_{3-\delta}$, where $0.5 \geq x \geq 0.2$ and $1 \geq y \geq 0.2$. In particular, the perovskite oxide mixed conductor may comprise one or more of $La_{0.6}Sr_{0.4}Co_{0.2}Fe_{0.8}O_{3-\delta}$, $Gd_{0.5}CoO_{3-\delta}$, and $RE_xSr_{1-x}CoO_{3-d}$, (where RE=La, Sm, Pr and $0.5<x<0.8$). It can be useful to use these compounds as they have a higher ionic conductivity than most perovskites. In some cases, the mixture comprises in the range 20 to 50 wt % rare earth-doped ceria, in some cases 30 to 45 wt %, in some cases 35 to 45 wt %, or around 40 wt % rare earth-doped ceria as defined above. This helps to enhance the compatibility between the cathode and electrolyte both chemically and in terms of the thermal expansion described above, and as these cerias have high charge transfer rates, their inclusion ensures a good rate of charge transfer between the electrolyte and the cathode.

The cathode will generally be sintered before use. The cathode will typically be applied as one or more layers (for instance active and current collecting) directly or indirectly over the sintered electrolyte and sintered under conditions similar those described above for the anode. This provides an intermediate temperature metal supported SOFC, which is robust to repeated REDOX cycling, and as a result of the anode structure formed, to fuel depravation whilst at high temperature.

In a second aspect of the invention there is provided a metal supported SOFC comprising an anode, a cathode and an electrolyte, wherein the anode includes nickel, copper and a rare earth-doped ceria. As described above, to provide a robust fuel cell structure, the nickel, copper and rare earth-doped ceria are generally sintered. In use, the nickel may be in a form comprising metallic nickel, nickel oxide and combinations thereof; depending upon the REDOX state of the nickel. For instance, the nickel will be in the form of nickel oxide upon formation of the cell, but will be reduced to nickel metal at the point of first use of the cell. Similarly, the copper may be in a form comprising metallic copper, copper (I) oxide, copper (II) oxide and combinations thereof. Further, mixed metal and metal oxide phases may be formed, due to the mutual solubility of nickel and copper at high temperatures. As such, it may be the case that a nickel-copper alloy is formed, which when oxidised forms a nickel-copper mixed metal oxide, which could be generally described as having the formula $Ni_xCu_{1-x}O$, with x being variable between 0 and 1 as would be understood by the skilled reader. Mixed oxides containing cerium could also be formed, due to the solubility of copper oxide in doped ceria. The anode, cathode, and electrolyte will, in other respects, be generally as described above.

In some instances, the fuel cell will be a fuel cell of the type described in the applicants granted patent GB 2 368 450, which is incorporated herein by reference. In such cases, the fuel cell may comprise:

(i) a ferritic stainless steel support including a porous region and a non-porous region bounding the porous region;

(ii) a ferritic stainless steel bi-polar plate located under one surface of the porous region of the support and being sealingly attached to the non-porous region of the support about the porous region thereof;

(iii) an anode comprising an anode layer located over the other surface of the porous region of the support;

(iv) an electrolyte comprising an electrolyte layer located over the anode layer; and (v) a cathode comprising a cathode layer located over the electrolyte layer;

wherein the anode includes nickel, copper and a rare earth-doped ceria.

The fuel cell may be present in a fuel cell stack, comprising two or more fuel cells, and there is therefore provided in a third aspect of the invention, a fuel cell stack comprising fuel cells according to the second aspect of the invention. Each fuel cell may comprise a bi-polar plate, as described above, to which the support may be welded, or otherwise sealed.

In a fourth aspect of the invention, there is also provided for the use of a fuel cell according to the second aspect of the invention in the generation of electrical energy.

The process of the invention is intended to provide a method for the manufacture of a highly sintered nickel-copper-rare earth-doped ceria thick film anode suitable for use in a metal supported SOFC cell, whilst avoiding the problems of poor anodic sintering, and delamination of the electrolyte in use. It may be the case that the process is a process for forming a metal supported solid oxide fuel cell, the process comprising the steps of:

a) applying a green anode layer including nickel oxide, copper oxide and a rare earth-doped ceria (optionally powdered) to a metal substrate, wherein the powders are optionally of particle size distribution d90 in the range 0.2 to 3 µm and wherein the nickel oxide, copper oxide and rare-earth doped ceria are optionally applied as an ink, the ink optionally comprising a total solids content in the range 30 to 70% mixed metal oxides, with optionally in the range 5 to 50 wt % of the total metal oxide of copper oxide;

b) optionally drying the ink to provide a printed layer of thickness in the range 5 to 40 µm;

c) optionally compressing the green anode layer at pressures optionally in the range 100 to 300 MPa;

d) optionally, heating the printed layer to remove the ink base leaving a green anode layer comprising nickel oxide, copper oxide and a rare earth-doped ceria;

e) firing the green anode layer at a temperature optionally in the range 950 to 1100° C. to form a composite;

f) providing an electrolyte; and g) providing a cathode.

Unless otherwise stated each of the integers described in the invention may be used in combination with any other integer as would be understood by the person skilled in the art. Further, although all aspects of the invention preferably "comprise" the features described in relation to that aspect, it is specifically envisaged that they may "consist" or "consist essentially" of those features outlined in the claims. In addition, all terms, unless specifically defined herein, are intended to be given their commonly understood meaning in the art.

Further, in the discussion of the invention, unless stated to the contrary, the disclosure of alternative values for the upper or lower limit of the permitted range of a parameter, is to be construed as an implied statement that each intermediate value of said parameter, lying between the smaller and greater of the alternatives, is itself also disclosed as a possible value for the parameter.

In addition, unless otherwise stated, all numerical values appearing in this application are to be understood as being modified by the term "about".

BRIEF DESCRIPTION OF THE DRAWINGS

In order that the present invention may be more readily understood, it will be described further with reference to the figures and to the specific examples hereinafter.

DETAILED DESCRIPTION

Figure 1:
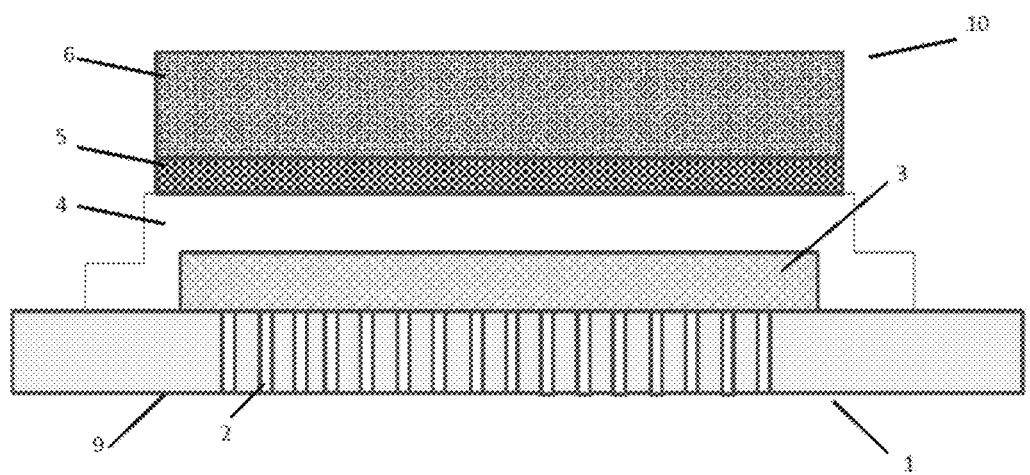
FIG. 1 is a schematic representation of a SOFC as described in GB 2 368 450.
Figure 2:
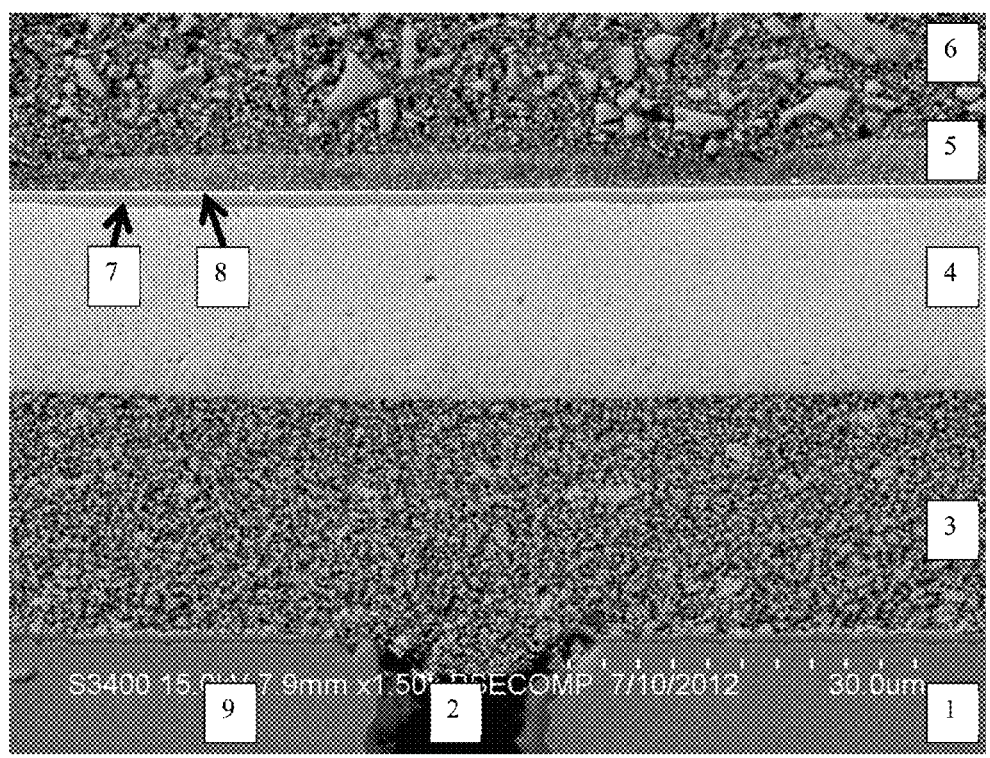
FIG. 2 is a scanning electron micrograph (SEM) showing a cross section through a SOFC of FIG. 1 (15.0 kV, 7.9 mm×1.50 k)

A SOFC 10 as described in GB 2 368 450 is shown schematically in FIG. 1, and in SEM cross-section in FIG. 2. Both figures show a ferritic stainless steel substrate 1, made partially porous by laser-drilling thousands of holes though the central region of the substrate 2. The porous substrate is covered by a nickel oxide and CGO anode layer 3 covering the porous region 2 of the substrate 1. Over the anode layer 3 is deposited a CGO electrolyte layer 4 (10-20 μm, CGO), which overlaps the anode 3 onto the undrilled area 9 of the substrate 1, thus forming a seal around the edge of the anode 3. The cathode 5,6 has a thin active layer 5 (CGO composite) where the reduction of oxygen takes place, and a thicker current collector layer 6 (lanthanum strontium cobaltite) to allow current to be collected from the cell 10 in a stack. FIG. 2 additionally shows a very thin stabilised zirconia layer 7 and an even thinner doped ceria layer 8, which block electronic conductivity (preventing short circuiting from undesirable chemical reactions between the cathode 5,6 and zirconia layer 7) and form the interface between the anode 3 and electrolyte 5,6 respectively.

SOFC 10 of FIGS. 1 and 2 was prepared by applying a screen-printing ink containing suspended particles of nickel oxide powder and CGO powder (d90=0.7 to 1.2 μm, ratio of nickel oxide to CGO in the ink being 1.8:1 by weight). The ink was screen printed onto ferritic stainless steel substrate 1 using conventional methods, and dried in an oven to evaporate the solvents and set the binders thereby forming a dried, printed layer of thickness 9 to 15 μm. The dried, printed layer was compressed using cold isostatic pressing at pressure of 300 MPa. The green anode layer was placed in a furnace and heated to a temperature of 960° C. in air atmosphere for 40 minutes, to produce a sintered anode layer 3. A CGO electrolyte layer 4 was sprayed onto the anode layer 3 and fired in a furnace at 1020° C. for 40 minutes. Finally, zirconia layer 7 was applied to the fired electrolyte layer by means of the method disclosed in GB 2 456 445 followed by application of the doped ceria layer 8 and the two cathodic layers 5,6 also using the methods of GB 2 456 445, before firing at a temperature of 825° C. to produce the SOFC 1 structure.

Figure 3:
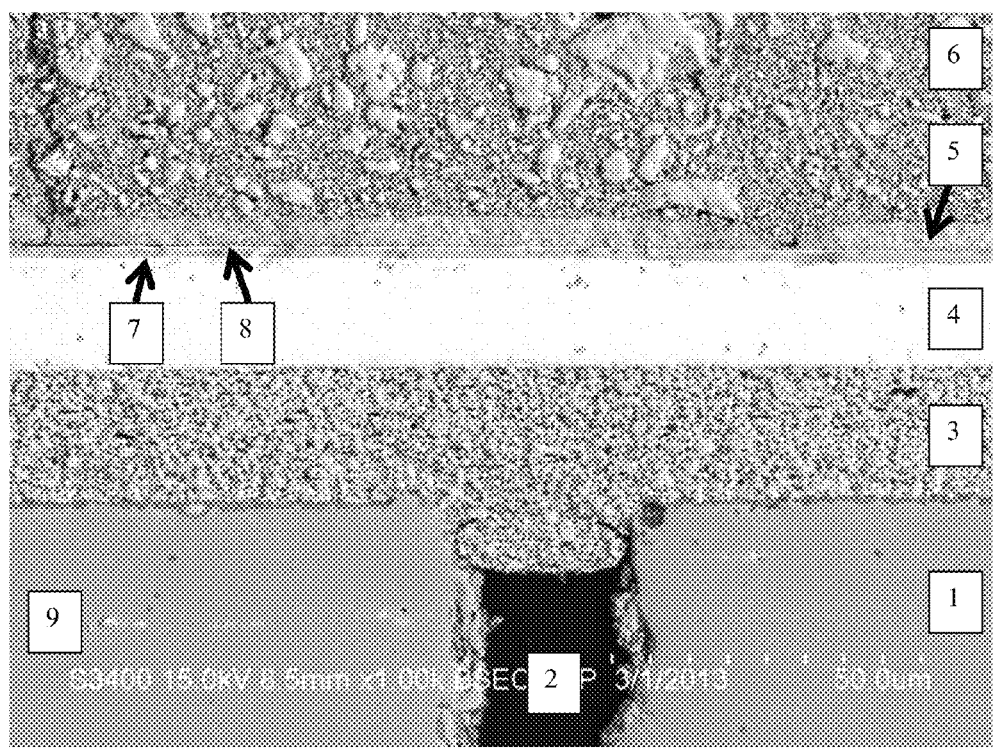
FIG. 3 is a SEM showing a cross section through a SOFC including an anode formed from a nickel oxide-copper-oxide-GCO composite (15.0 kV, 8.5 mm×1.0 k)

FIG. 3 shows a cross-section through a SOFC including nickel oxide-copper oxide-CGO composite as claimed. The nickel oxide and copper oxide are present in a 9:1 ratio by weight resulting in a 9:1 ratio of nickel to copper in use. Subject to the introduction of copper into the anodic structure such that the 1:1.3 ratio of nickel oxide:CGO described above becomes a 1:1.3 ratio of the mixed metal oxide (namely nickel oxide and copper oxide) to CGO, the structure of the fuel cell was in accordance with the prior art cell of FIGS. 1 and 2. The manufacture closely followed the preparation method of the prior art cell, with the exception that the dried printed layer was heated in an oven to a temperature of 350° C. prior to compression to remove the organic binders in the ink and provide a green anode layer, and that the firing of the anode was at 1020° C. for 45 minutes.

EXAMPLES

Anode Structure

Figure 4:
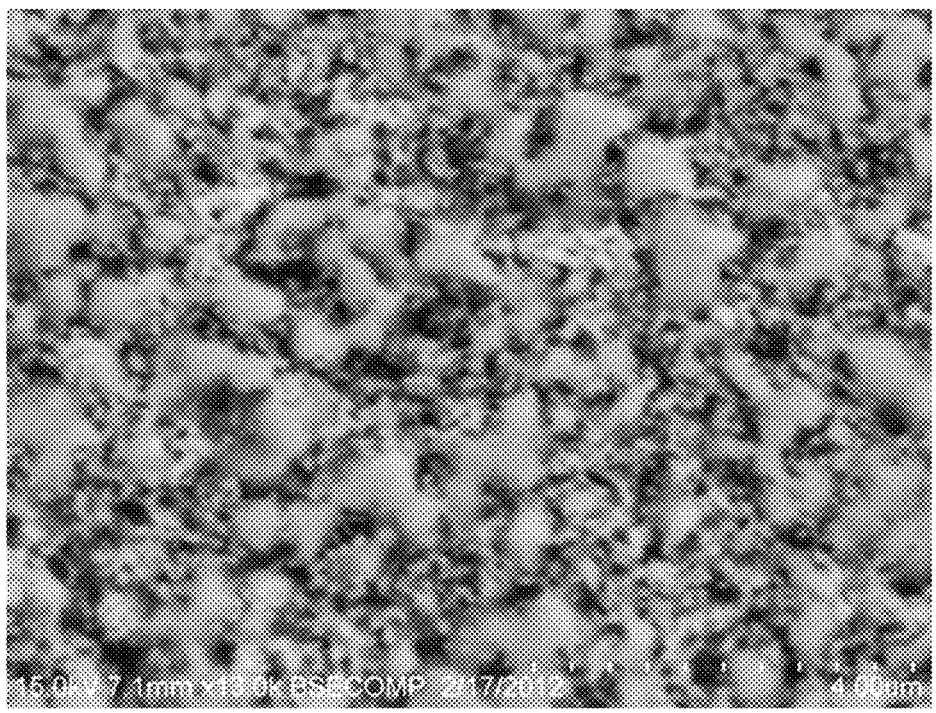
FIG. 4 is a SEM showing a cross section of a sintered anode formed from a nickel oxide-GCO composite (15.0 kV, 7.1 mm×13 k)
Figure 5:
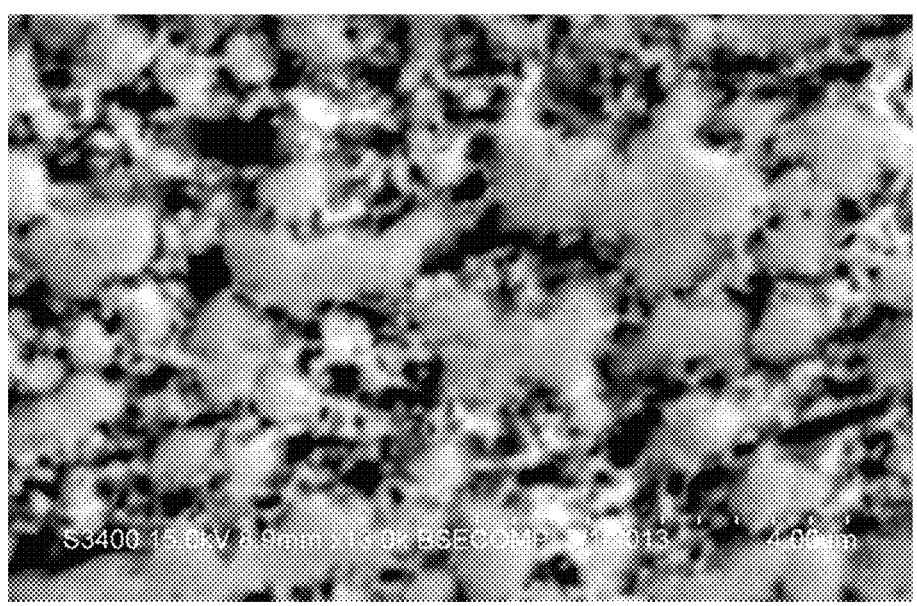
FIG. 5 is a SEM showing a cross section of a sintered anode formed from a nickel oxide-copper-oxide-GCO composite (15.0 kV, 8.9 mm×13 k)

FIGS. 4 and 5 show the difference in anode structure obtained through the addition of copper oxide to the composite structure. The composite of FIG. 4 has the composition 64 wt % nickel oxide to 36 wt % CGO and the composite of FIG. 5, 51 wt % nickel oxide, 5.7 wt % copper (II) oxide and 43.3 wt % CGO. In order to improve the REDOX stability of the nickel-copper anode in FIG. 5, the level of metal oxide was reduced somewhat relative to the original anode shown in FIG. 4. After reduction during fuel cell operation, the anode cermet in FIG. 4 is 53 vol % metal as opposed to 45 vol % metal in FIG. 5. It has been shown that reducing the metal content alone does not confer adequate REDOX stability; the addition of copper is required as well. Both composites were prepared as above, and fired in air at 1020° C. for 60 minutes before fabrication into cells and reduction to metal in situ to form the cermets shown.

Good sintering is evidenced by a clear distinction between ceramic and metallic regions, and by the particles of both ceramic and metallic phases having fused together. The ceramic regions appearing as light regions and the metallic regions as dark patches. As can be seen, the composite of FIG. 5, which contains copper, includes larger, darker metal particles, indicating good sintering, the well sintered structure of the CGO is also readily apparent. This well sintered structure can also be seen in FIG. 3 (anode 3).

The resulting anode structure has been demonstrated to be highly REDOX-stable at operating temperatures of <650° C., being capable of withstanding hundreds of high-temperature fuel interruptions without significant cell performance degradation.

Selection of Copper

A range of cations are known to enhance doped ceria sintering, these include copper, cobalt, iron, manganese and lithium (U.S. Pat. No. 6,709,628, J. D. Nicholas and L. C. De Jonghe, Solid State Ionics, 178 (2007), 1187-1194). Consideration was therefore given to doping the rare earth-doped ceria with one of these cations. Of the above cations, copper, cobalt and lithium are reported to the most effective at enhancing the sintering of rare earth-doped ceria. Copper and cobalt are the only cations considered by the applicant to be suitable for use in an SOFC anode as lithium oxide is highly reactive, and in addition is known to be very detrimental to the ionic conductivity of rare earth-doped ceria by forming an insulating phase on the grain boundaries. Cobalt is well known to enhance the sintering of rare earth-doped ceria, and in addition is known to be effective as an anode catalyst (C. M. Grgicak, R. C. Green and J. B. Giorgi, J. Power Sources, 179(1), 2008, 317-328), although typically less so than nickel. However initial evaluation of the sintering behaviour of composites using a push-rod dilatometer surprisingly demonstrated that cobalt oxide is ineffective in enhancing the sintering of nickel oxide, and thus the sinterability of the anode composite was not significantly enhanced by the partial or even complete substitution of nickel oxide with cobalt oxide. Copper oxide by contrast demonstrated a great increase in the sinterability of the composite, partly it is suspected because it may form a low melting-point eutectic with nickel oxide, thus introducing some liquid-phase sintering.

Fuel Cell Performance

Figure 6:
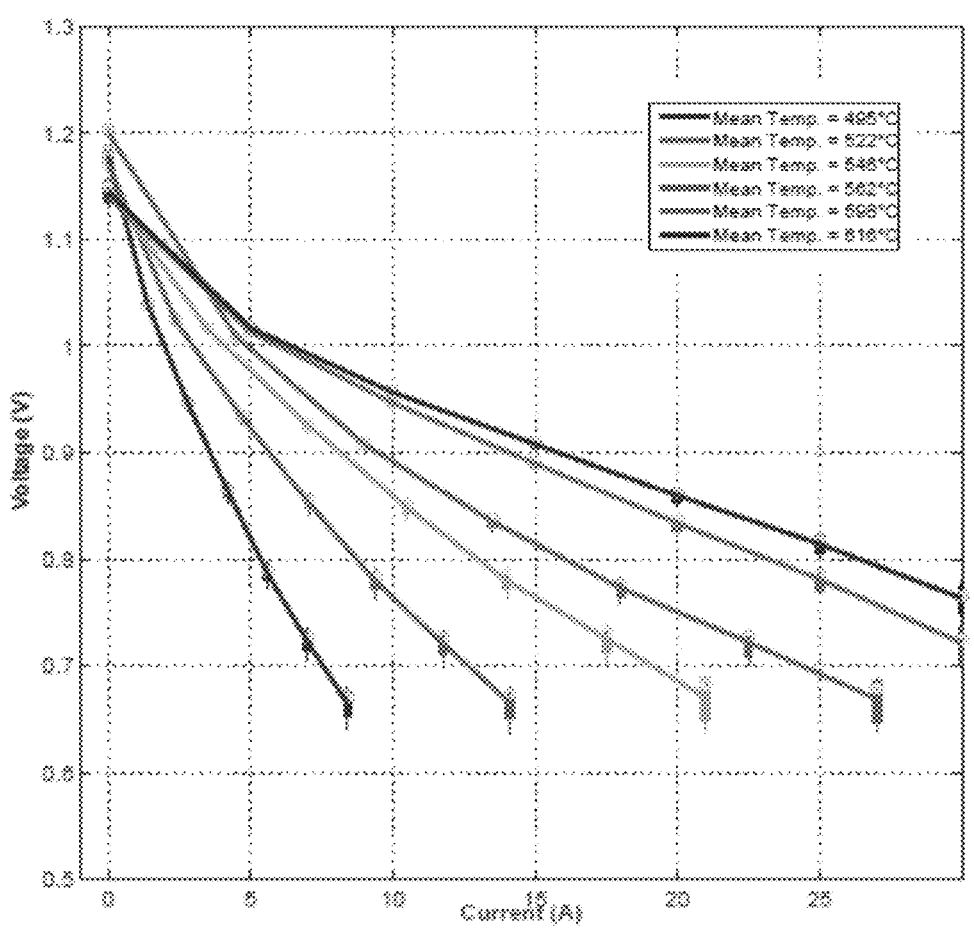
FIG. 6 is a current-voltage curve for the SOFC of FIG. 3 as a function of cell operating temperature (56% hydrogen-44% nitrogen fuel, excess air fed to cathode)

FIG. 6 is a series of current-voltage polarisation curves for the fuel cell of FIG. 3, at different operating temperatures. Fuelling rate was calculated to give approximately 60% fuel utilisation at 0.75V/cell at each of the measured temperatures, showing that the system can be operated across a range of temperatures at least as broad as 495 to 616° C., allowing the operational temperature to be optimised for application, number of cells in the stack, output required etc.

Figures 7, 8:
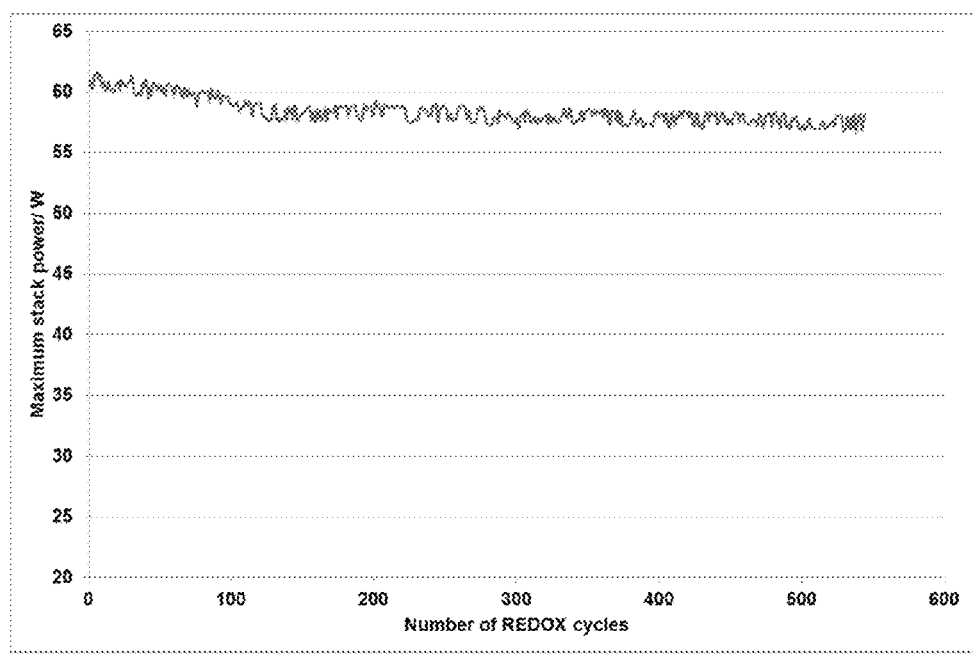
FIG. 7 is a power-cycle graph of the SOFC of FIG. 3.
FIG. 8 is a table showing the enhanced mechanical strength of the nickel oxide-copper-oxide-GCO composite as illustrated in FIG. 3 relative to the nickel-CGO anode illustrated in FIG. 2.

FIG. 7 shows the very good REDOX stability possible with this anode structure. A series of cycles are run at 600° C. on a seven-layer short stack, where a current-voltage curve is run to establish the stack performance. The stack is then returned to open circuit, and the hydrogen supply to the stack is cut whilst maintaining the stack at 580-600° C. Air and nitrogen are maintained to the stack during this period. The fuel interruption is sustained for 20 minutes, allowing time for the anode to partially reoxidise. The hydrogen feed is then restored, and after giving the stack a few minutes to recover, another current-voltage curve is run to determine if stack performance has been lost as a result of the REDOX cycle of the anode. This sequence continues until stack performance starts to fall, indicating damage to one or more cells as a result of REDOX cycling.

It can be seen from FIG. 7 that with the SOFC cell of FIG. 3, the seven cells within the stack will tolerate more than 500 REDOX cycles without any significant loss of performance after a small initial burn-in, with 544 cycles being run in total.

Enhanced Mechanical Strength of Anode Resulting from Copper Addition

FIG. 8 is a table of the results of mechanical strength tests undertaken on SOFC cells both after initial manufacture and after cells have operated in an initial performance characterisation test, for both standard nickel-CGO anodes as illustrated in FIG. 2, and nickel-copper-CGO anodes as illustrated in FIG. 3.

In the as-manufactured cells, the anodes are in the oxidised state and prior to the mechanical test they are reduced in order to mimic the anode structure in the cell at the start of operating, whereas the anodes in the "after operating" cells are in the final cermet state of the working anodes.

In order to perform the mechanical strength measurement on the cells, the metal substrates of the cells are first glued to a flat steel plate to prevent the cells flexing when a pulling force is applied. The cathodes of the cells are removed mechanically, exposing the electrolyte.

To assess the mechanical strength of the anode and/or the anode-electrolyte bond, circular metal test pieces are glued to the electrolyte surface in the four corners of the electrolyte and the middle of the cell. A diamond scribe is used to cut through the ceramic layers of the cell around the metal test piece. A calibrated hydraulic puller is then attached to the test piece and used to measure the stress required to pull the test piece off the cell substrate. A maximum pulling stress of 17 MPa may be applied using this technique, after which the glue holding the test piece to the electrolyte tends to fail rather than the fuel cell layers on test. Should the test piece be pulled off at less than 17 MPa this indicates the failure stress of the weakest cell layer (usually the internal structure of the anode).

It can be seen that whilst the standard nickel-CGO anodes are strong in the as-manufactured state, they fail at much lower stresses after reduction of the nickel oxide to metallic nickel in the "after operating" cell. Without being bound by theory, it is believed this is largely because of the lack of a contiguous ceramic structure within the anode, meaning the mechanical strength of the anode is provided entirely by relatively weak necks between nickel particles. By contrast it can be seen that the nickel-copper CGO anodes retain their strength after reduction to the cermet structure, indicating much greater sintering of both metallic and ceramic phases.

It should be appreciated that the processes and fuel cell of the invention are capable of being incorporated in the form of a variety of embodiments, only a few of which have been illustrated and described above.

The invention claimed is:

1. A metal supported solid oxide fuel cell, comprising:
   (i) a ferritic stainless steel support including a porous region and a non-porous region bounding the porous region;
   (ii) a ferritic stainless steel bi-polar plate located under one surface of the porous region of the support and being sealingly attached to the non-porous region of the support about the porous region thereof;
   (iii) an anode comprising an anode layer located over the other surface of the porous region of the support;
   (iv) an electrolyte comprising an electrolyte layer located over the anode layer; and
   (v) a cathode comprising a cathode layer located over the electrolyte layer;
   wherein the anode includes nickel, copper and a rare earth-doped ceria;
   wherein the copper is in a copper oxide selected from copper (II) oxide, copper (I) oxide, a nickel-copper oxide and combinations thereof;
   wherein the anode comprises metal oxides; and
   wherein the copper oxide is present in the range around 8 to 12 wt % of the total metal oxide content.

2. The fuel cell according to claim 1, wherein the nickel, copper and rare earth-doped ceria are sintered.

3. The fuel cell according to claim 1, wherein the nickel is in a form selected from metallic nickel, nickel oxide, a nickel-copper alloy, a nickel-copper oxide and combinations thereof.

4. The fuel cell according to claim 1, wherein the rare earth-doped ceria comprises gadolinium doped cerium oxide.

5. A fuel cell stack comprising two or more fuel cells according to claim 1.

* * * * *